US012736701B2

(12) United States Patent
Sun et al.

(10) Patent No.: US 12,736,701 B2
(45) Date of Patent: Sep. 15, 2026

(54) FAST APPROACH FOR ACOUSTIC IMPEDANCE COMPUTATION THROUGH DIMENSION EXPANSION

(71) Applicant: Halliburton Energy Services, Inc., Houston, TX (US)

(72) Inventors: Jichun Sun, Singapore (SG); Xusong Wang, Singapore (SG); Xiang Wu, Singapore (SG); Christopher Michael Jones, Houston, TX (US); Qingtao Sun, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 285 days.

(21) Appl. No.: 18/388,437

(22) Filed: Nov. 9, 2023

(65) Prior Publication Data

US 2024/0369731 A1 Nov. 7, 2024

Related U.S. Application Data

(60) Provisional application No. 63/463,377, filed on May 2, 2023.

(51) Int. Cl.
*G01V 1/50* (2006.01)
*G01V 1/52* (2006.01)
*G01V 3/30* (2006.01)

(52) U.S. Cl.
CPC .................. *G01V 1/52* (2013.01); *G01V 1/50* (2013.01); *G01V 3/30* (2013.01)

(58) Field of Classification Search
CPC .................................. G01V 1/52; G01V 3/30
See application file for complete search history.

(56) References Cited

U.S. PATENT DOCUMENTS

2009/0213689 A1 8/2009 Tello
2016/0103238 A1 4/2016 Van Kuijk et al.
2016/0108730 A1 4/2016 Fanini et al.
2016/0109604 A1 4/2016 Zeroug et al.
2016/0109605 A1 4/2016 Bose et al.
2018/0058211 A1* 3/2018 Liang ...................... E21B 44/00
2019/0025450 A1* 1/2019 Teague .................. E21B 47/005

OTHER PUBLICATIONS

International Search Report & Written Opinion; PCT Application No. PCT/US2023/037201; mailed Mar. 13, 2024.

* cited by examiner

*Primary Examiner* — Krystine E Breier
(74) *Attorney, Agent, or Firm* — NOVAK DRUCE CARROLL LLP

(57) ABSTRACT

Described herein are systems and techniques for an improved method for determining and evaluating an impedance of an annulus associated with a casing of a wellbore. For example, aspects of the present disclosure relate to systems and techniques for performing two-dimensional (2D) and/or three-dimensional (3D) simulations (e.g., 2D and 3D numerical modeling) for predicting physical properties of a material or sample and determining calibration functions used to improve the efficiency and accuracy of the determined impedance results.

7 Claims, 13 Drawing Sheets

FAST APPROACH FOR ACOUSTIC IMPEDANCE COMPUTATION THROUGH DIMENSION EXPANSION

CROSS-REFERENCE TO RELATED APPLICATIONS

This application claims benefit of U.S. Provisional Application No. 63/463,377 filed May 2, 2023, which is incorporated herein by reference.

TECHNICAL FIELD

The present disclosure generally relates to determining and evaluating an impedance of an annulus associated with a casing of a wellbore. For example, aspects of the present disclosure relate to systems and techniques for performing two-dimensional (2D) and/or three-dimensional (3D) simulations (e.g., 2D and 3D numerical modeling) for predicting physical properties of a material or sample, and determining calibration functions used to improve the efficiency and accuracy of the determined impedance results.

BACKGROUND

To manage oil and gas drilling and production environments (e.g., wellbores, etc.) and perform operations in the oil and gas drilling and production environments, operators typically obtain and evaluate various types of data, such as measurements and other sensor data, to gain insights about Earth formations and conditions in a wellbore. Sensor data can be used to identify features within an Earth formation and other details about a wellbore and/or associated operations. For example, acoustic logging tools can send acoustic ultrasonic signals into the casing and generate signals based on the reflections received. Additionally, acoustic logging tools can detect echoes that can result from vibrations, and these can be used to determine various properties of the materials behind the casing. Typically, computing resources can be used to make or facilitate various determinations and estimates used to manage a wellbore environment and/or perform wellbore operations. The computations used to make or facilitate such determinations and estimates can be resource intensive and can cause expensive delays, which can increase costs and impact wellbore operations.

BRIEF DESCRIPTION OF THE DRAWINGS

Illustrative examples and aspects of the present application are described in detail below with reference to the following figures.

DETAILED DESCRIPTION

Figure 1A:
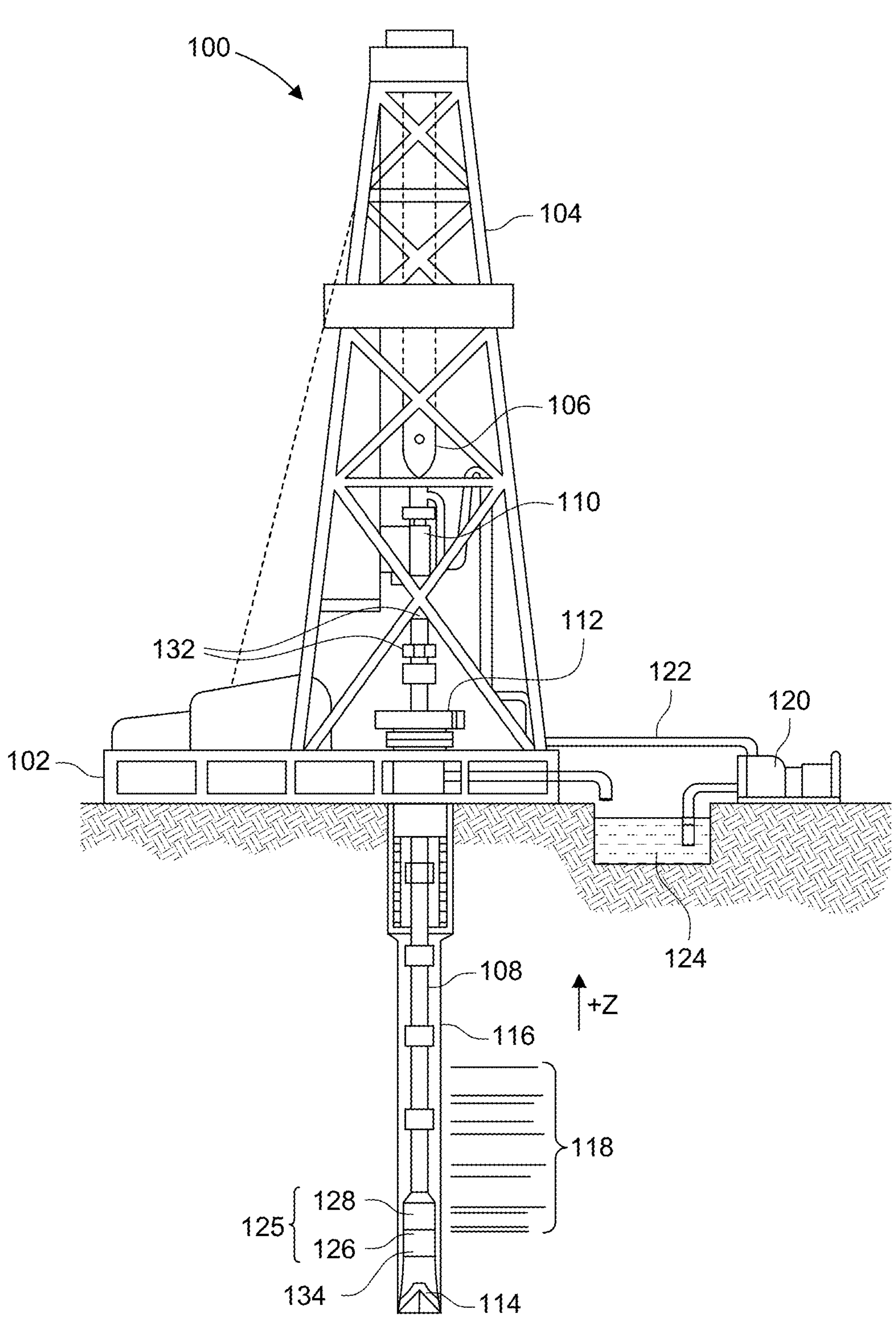
FIG. 1A is a schematic side-view of an example wireline logging environment, according to some examples of the present disclosure.

Various aspects and examples of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one embodiment or an embodiment, one aspect or an aspect, or one example or an example in the present disclosure can refer to the same embodiment/example/aspect/etc., or any embodiment/example/aspect/etc., and such references mean at least one of the embodiments, examples, and/or aspects.

Moreover, reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Also, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, techniques, systems, apparatuses, methods (also referred to as processes herein), non-transitory computer-readable media, and their related results according to the examples and aspects of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Described herein are systems, apparatuses, processes (also referred to as methods), and computer-readable media (collectively referred to as "systems and techniques") for determining the annulus impedance behind the casing (and/or within a proximity of a casing).

Determining and evaluating the annulus impedance behind the casing of a wellbore can be an important function for wellbore operators for a variety of reasons. In some examples, acoustic logging tools can send acoustic ultrasonic signals into the casing and generate signals based on the reflections received. Additionally, acoustic logging tools can detect echoes that can result from vibrations, which can be used to determine various properties of the materials behind the casing. In some examples, a pulse-echo measurement workflow can be used to evaluate the annulus impedance behind the casing. In some examples, a raw impedance (based on a one-dimensional (1D) assumption) can be computed in the field during wellbore operations, and subsequently calibrated to determine the annulus impedance. The calibration process can include a 3D numerical simulation using estimated and/or pre-determinedborehole information (such as casing size, thickness, borehole mud properties, physical properties of a sample such as density and/or elasticity, and/or a range of possible impedance of the annulus, for example). However, the 3D simulation can be time-consuming and can therefore delay the entire calibration process. Further, since this workflow maps a 1D inverted raw impedance to a final impedance (which can be intrinsically 3D), the accuracy of the computed final impedance can also be limited.

Therefore, in order to improve the efficiency of determining the annulus impedance behind the casing of a wellbore, the correlation between the raw impedance obtained from a 2D simulation and that from 3D simulation can be used. In some examples, performing a 2D simulation can take significantly less time than performing a 3D simulation (e.g., in some cases a 2D simulation can take about 1% of the time that it takes to perform a 3D simulation). Therefore, in some cases, a 2D simulation can be used to speed up the calibration process. The 2D simulation can provide accurate results and/or can enable faster, more efficient calibration without a significant reduction in an accuracy (e.g., with less than a threshold reduction) relative to 3D simulation. Additionally, using the raw impedance obtained from a 2D inversion (rather than a 1D inversion) can also improve the accuracy of the computed final impedance.

Examples of the systems and techniques described herein are illustrated in FIG. 1A through FIG. 10 and described below.

FIG. 1A is a schematic diagram of an example logging while drilling wellbore operating environment, according to some examples of the present disclosure. The drilling arrangement shown in FIG. 1A provides an example of a logging-while-drilling (commonly abbreviated as LWD) configuration in a wellbore drilling scenario 100. The LWD configuration can incorporate sensors (e.g., EM sensors, seismic sensors, gravity sensor, image sensors, etc.) that can acquire formation data, such as characteristics of the formation, components of the formation, etc. For example, the drilling arrangement shown in FIG. 1A can be used to gather formation data through an electromagnetic imager tool (not shown) as part of logging the wellbore using the electromagnetic imager tool. In other examples, the drilling arrangement shown in FIG. 1A can be used to gather formation data through acoustic logging tools can send acoustic ultrasonic signals into the casing and generate signals based on the reflections received. The drilling arrangement of FIG. 1A also exemplifies what is referred to as Measurement While Drilling (commonly abbreviated as MWD) which utilizes sensors to acquire data from which the wellbore's path and position in three-dimensional space can be determined. FIG. 1A shows a drilling platform 102 equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, it creates a wellbore 116 that passes through various subterranean formations 118. A pump 120 circulates drilling fluid through a supply pipe 122 to top drive 110, down through the interior of drill string 108 and out orifices in drill bit 114 into the wellbore. The drilling fluid returns to the surface via the annulus around drill string 108, and into a retention pit 124. The drilling fluid transports cuttings from the wellbore 116 into the retention pit 124 and the drilling fluid's presence in the annulus aids in maintaining the integrity of the wellbore 116. Various materials can be used for drilling fluid, including oil-based fluids and water-based fluids.

Logging tools 126 can be integrated into the bottom-hole assembly 125 near the drill bit 114. As drill bit 114 extends into the wellbore 116 through the formations 118 and as the drill string 108 is pulled out of the wellbore 116, logging tools 126 collect measurements relating to various formation properties as well as the orientation of the tool and various other drilling conditions. The logging tool 126 can be applicable tools for collecting measurements in a drilling scenario, such as the electromagnetic imager tools or acoustic logging tools described herein. Each of the logging tools 126 may include one or more tool components spaced apart from each other and communicatively coupled by one or more wires and/or other communication arrangement. The logging tools 126 may also include one or more computing devices communicatively coupled with one or more of the tool components. The one or more computing devices may be configured to control or monitor a performance of the tool, process logging data, and/or carry out one or more aspects of the methods and processes of the present disclosure.

The bottom-hole assembly 125 may also include a telemetry sub 128 to transfer measurement data to a surface receiver 132 and to receive commands from the surface. In at least some cases, the telemetry sub 128 communicates with a surface receiver 132 by wireless signal transmission (e.g., using mud pulse telemetry, EM telemetry, or acoustic telemetry). In other cases, one or more of the logging tools 126 may communicate with a surface receiver 132 by a wire, such as wired drill pipe. In some instances, the telemetry sub 128 does not communicate with the surface, but rather stores logging data for later retrieval at the surface when the logging assembly is recovered. In at least some cases, one or more of the logging tools 126 may receive electrical power from a wire that extends to the surface, including wires extending through a wired drill pipe. In other cases, power is provided from one or more batteries or via power generated downhole.

Collar 134 is a frequent component of a drill string 108 and generally resembles a very thick-walled cylindrical pipe, typically with threaded ends and a hollow core for the conveyance of drilling fluid. Multiple collars 134 can be included in the drill string 108 and are constructed and intended to be heavy to apply weight on the drill bit 114 to assist the drilling process. Because of the thickness of the collar's wall, pocket-type cutouts or other type recesses can be provided into the collar's wall without negatively impacting the integrity (strength, rigidity and the like) of the collar as a component of the drill string 108.

Figure 1B:
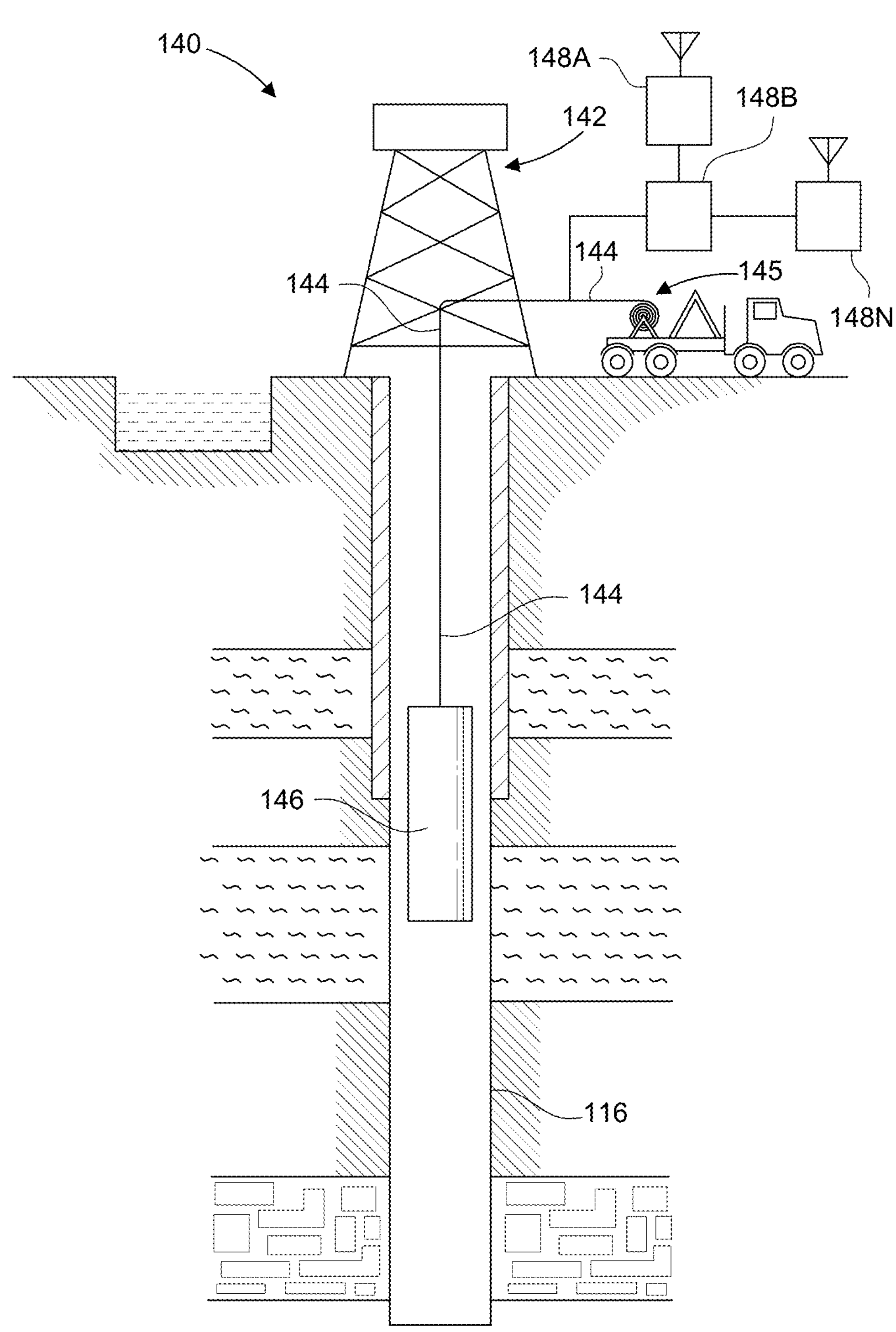
FIG. 1B is a schematic side-view of the example logging environment of FIG. 1A, according to some examples of the present disclosure.

FIG. 1B is a schematic diagram of an example downhole environment having tubulars, according to some examples of the present disclosure. In this example, an example system 140 is depicted for conducting downhole measurements after at least a portion of a wellbore has been drilled and the drill string removed from the well. An electromagnetic imager tool (not shown) can be operated in the example system 140 shown in FIG. 1B to log the wellbore. A downhole tool is shown having a tool body 146 in order to carry out logging and/or other operations. For example, instead of using the drill string 108 of FIG. 1A to lower the downhole tool, which can contain sensors and/or other instrumentation for detecting and logging nearby characteristics and conditions of the wellbore 116 and surrounding formations, a wireline conveyance 144 can be used. The tool body 146 can be lowered into the wellbore 116 by wireline conveyance 144. The wireline conveyance 144 can be anchored in the drill rig 142 or by a portable means such as a truck 145. The wireline conveyance 144 can include one or more wires, slicklines, cables, and/or the like, as well as tubular conveyances such as coiled tubing, joint tubing, or other tubulars. The downhole tool can include an applicable tool for collecting measurements in a drilling scenario, such as the electromagnetic imager tools described herein.

The illustrated wireline conveyance 144 provides power and support for the tool, as well as enabling communication between data processors 148A-N on the surface. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more of the processors 148A-N, which can include local and/or remote processors. The processors 148A-N can be integrated as part of an applicable computing system, such as the computing device architectures described herein. Moreover, power can be supplied via the wireline conveyance 144 to meet power requirements of the tool. For slickline or coiled tubing configurations, power can be supplied downhole with a battery or via a downhole generator.

Figure 2:
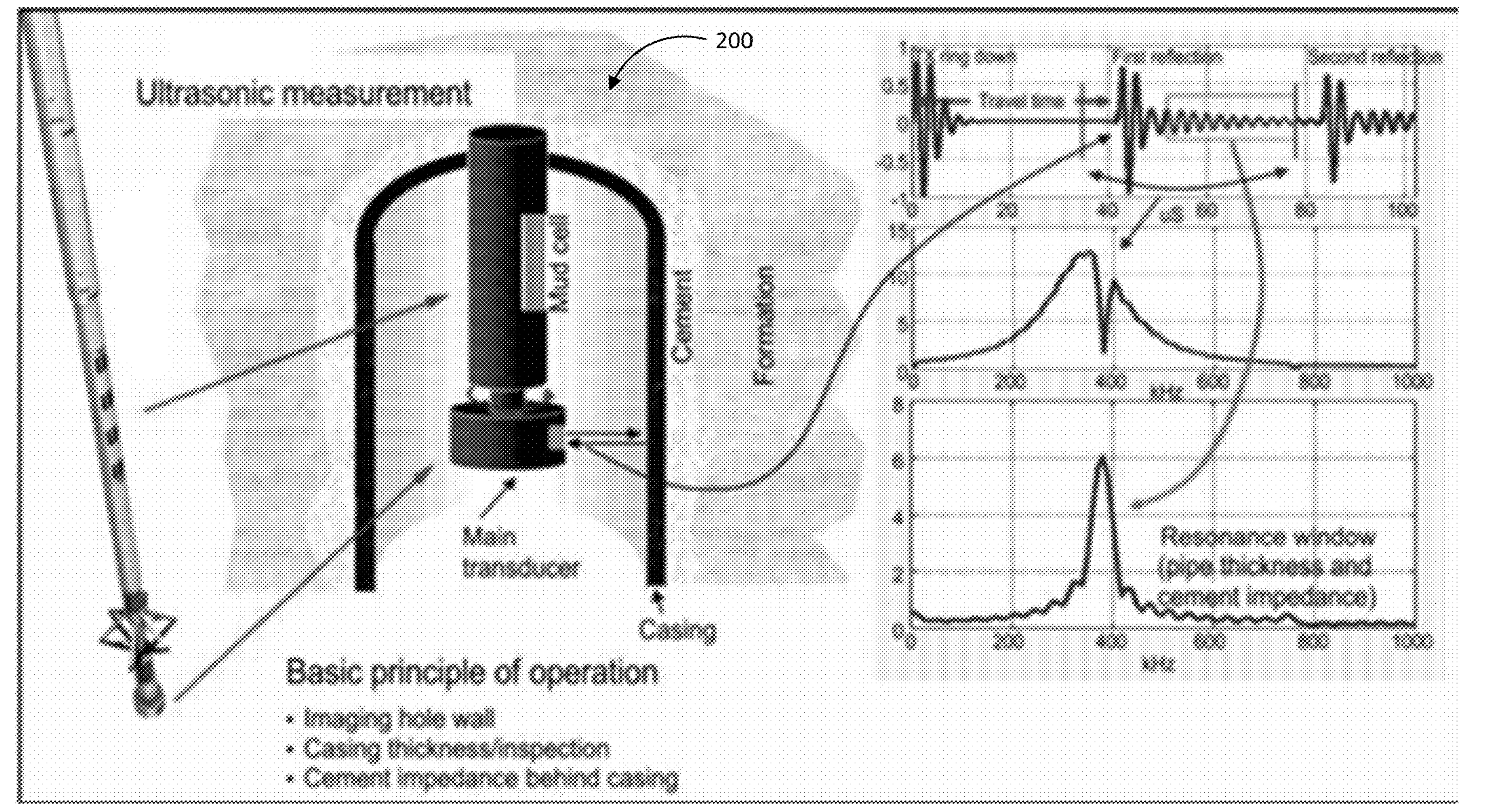
FIG. 2 illustrates an example ultrasonic measurement tool which may be used to perform certain illustrative methods of the present disclosure.

FIG. 2 illustrates an example ultrasonic measurement tool 200 that may be implemented by the systems and techniques of the present disclosure. In some examples, the ultrasonic measurement tool 200 can use ultrasonic signals to perform various measurements associated with the wellbore. In some examples, ultrasonic measurement tool 200 can also be used for downhole acoustic imaging for determining annulus impedance, casing thickness measurement, cement evaluation for cased holes, and formation evaluation for open holes. In some examples, ultrasonic measurement tool 200 can include a transducer whereby a source waveform can be transmitted through borehole fluids, which then reflects from (and transmits through) the formation. In some scenarios, the reflected waveforms can be measured as received waveforms. In the example ultrasonic measurement tool 200, the source can also function as the receiver, thereby rotating to measure at different azimuths. In some examples, the source can be unipole (i.e. in contrast to dipole or mono pole).

Figure 3:
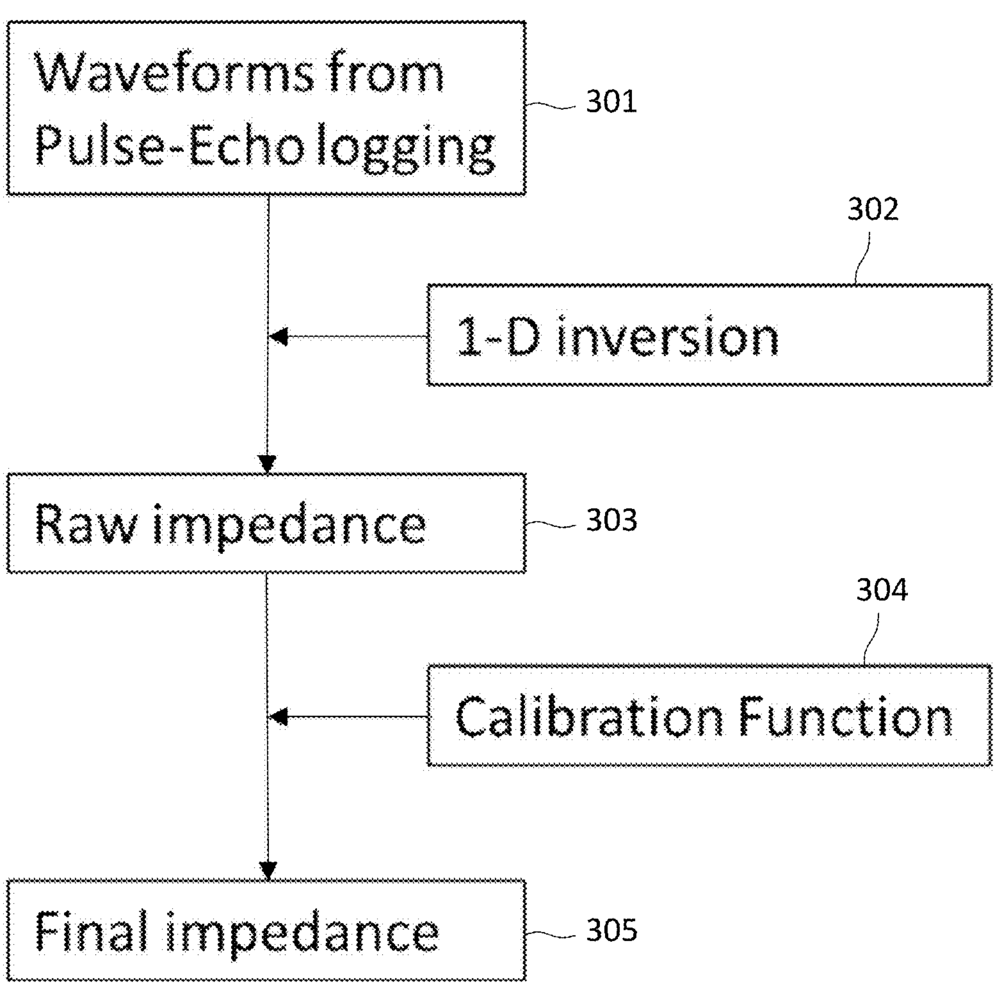
FIG. 3 illustrates a flowchart detailing an example high level pulse-echo workflow for determining the annulus impedance behind the casing, according to some examples of the present disclosure.

FIG. 3 illustrates a flowchart detailing an example high level pulse-echo workflow for determining the impedance of an annulus, such as an annulus behind a casing (or within a proximity of a casing) in a borehole/wellbore. As shown in FIG. 3, at block 301, in some examples, the process can obtain waveforms from pulse-echo logging tools using signals received from a downhole tool (such as the acoustic tool described in FIG. 2, for example) in the field during wellbore operations. In some examples, at block 302, the process can determine a raw impendence 303 by performing a ID inversion on the waveforms obtained at block 301. Subsequently, in some examples, a calibration function 304 can be implemented on the raw impendence 303 to determine a final annulus impedance 305. In some examples, the calibration process at block 304 can include performing a 3D numerical simulation using provided borehole information. As described above, the 3D simulation can be time-consuming and can slow the entire calibration process. Therefore, as described below in more detail, the calibration function 304 can be more efficient and also more accurate by making use of the correlation between raw impedance from 2D simulation and that from 3D simulation. In some examples, 2D simulation takes only about 1% of the time required for 3D simulation, and therefore can speed up the calibration process dramatically. Additionally, using raw impedance from 2D inversion instead of 1D inversion can also improve the accuracy of the computed final annulus impedance.

Figure 4:
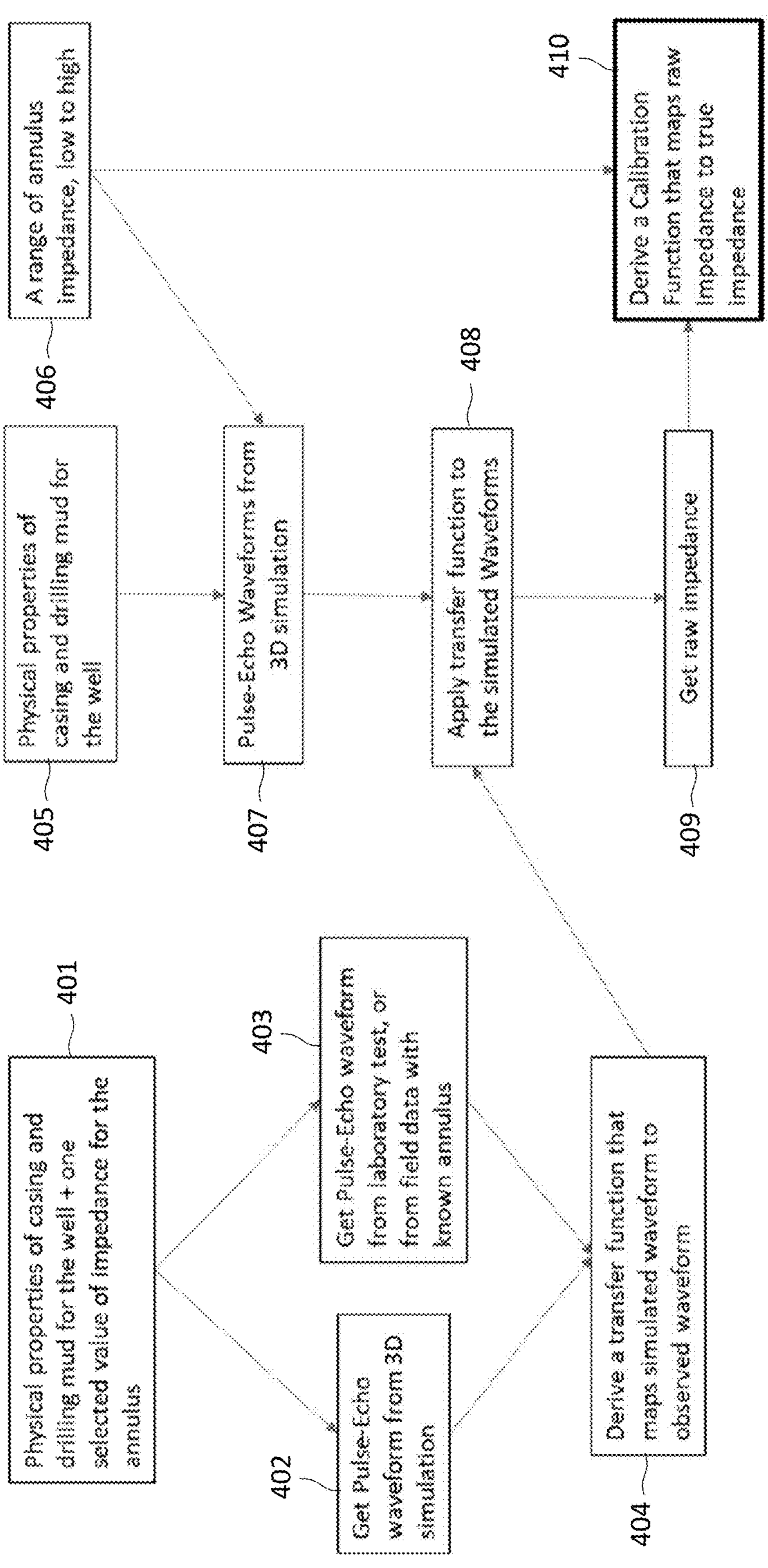
FIG. 4 illustrates a flowchart detailing an example workflow for deriving the calibration function described above with reference to FIG. 3, according to some examples of the present disclosure.

FIG. 4 illustrates a flowchart detailing an example workflow for deriving the calibration function described above with reference to FIG. 3 (e.g., block 304 in FIG. 3). In some examples, a transfer function that maps a simulated waveform to the observed waveform is determined (block 404). In some cases, this transfer function can be derived by determining a pulse-echo waveform from a 3D simulation (e.g., block 402 in FIG. 4) based on physical properties (e.g., density, elasticity, thickness, bonding, primary wave velocity, etc.) of the casing and drilling mud for the well plus one or more selected values of impedance for the annulus (block 401). In some examples, a pulse-echo waveform can be obtained from a laboratory test of from field data from an annulus (block 403) based on physical properties of the casing and drilling mud for the well plus one or more selected values of impedance for the annulus (block 401). These two pulse-echo waveforms (e.g., pulse-echo waveform obtained from a 3D simulation at block 402 and the pulse-echo waveform obtained at block 403) can be used to derive the transfer function at block 404.

At block 407, the process can obtain a pulse-echo waveform from a 3D simulation using physical propertied of the casing and drilling mud for the well (block 405) as well as a range of annulus impedance (block 406). In some examples, the range of annulus impedances can range from low to high. At block 408, the process can apply the transfer function that was derived at block 404 to the simulated waveforms obtained at block 407. In some examples, at block 409, the process can obtain the raw impedance using as input the result of applying the transfer function at block 408. In some examples, applying the transfer function that was derived at block 404 to the simulated waveforms obtained at block 407 can create a new waveform which can subsequently be used to obtain the raw impedance. In some examples, this raw impedance can be used to derive the calibration function described in FIG. 3 (e.g., block 304 in FIG. 3). In some examples, at block 410, the process can derive a calibration function and use the calibration function to map the raw impedance obtained at block 409 to the final impedance (e.g., block 305 in FIG. 3).

Figure 5A:
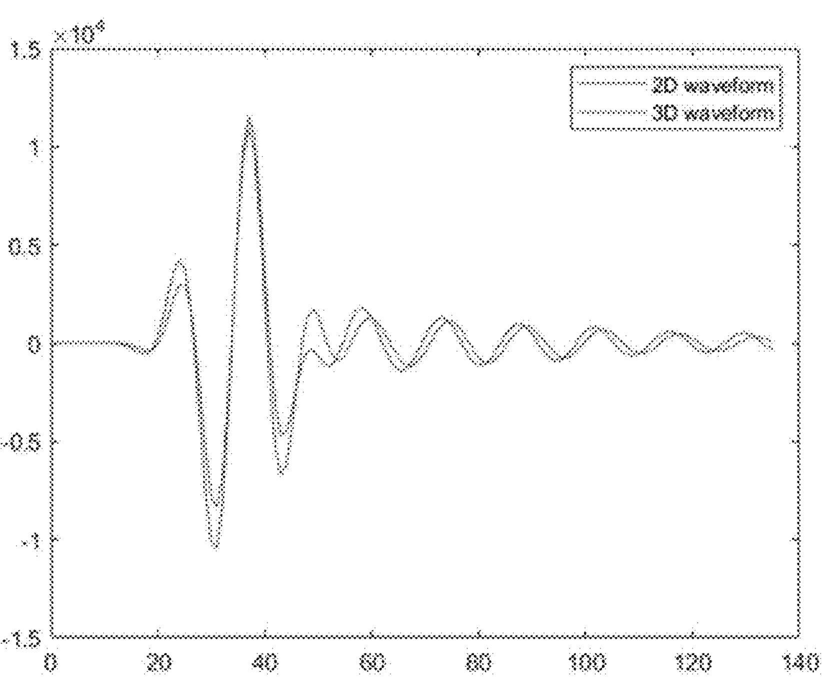
FIGS. 5A and 5B illustrate example comparisons of two-dimensional (2D) and three-dimensional (3D) waveforms, according to some examples of the present disclosure.
Figure 5B:
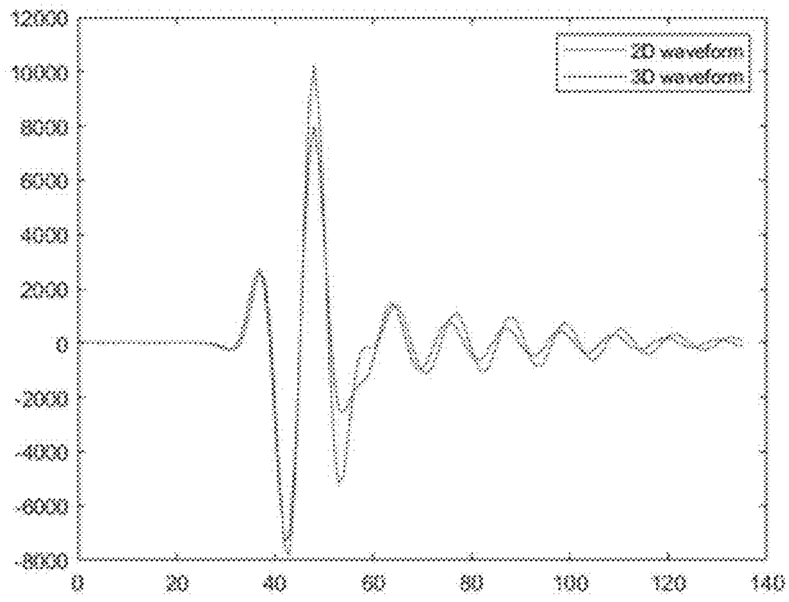
Figure 6A:
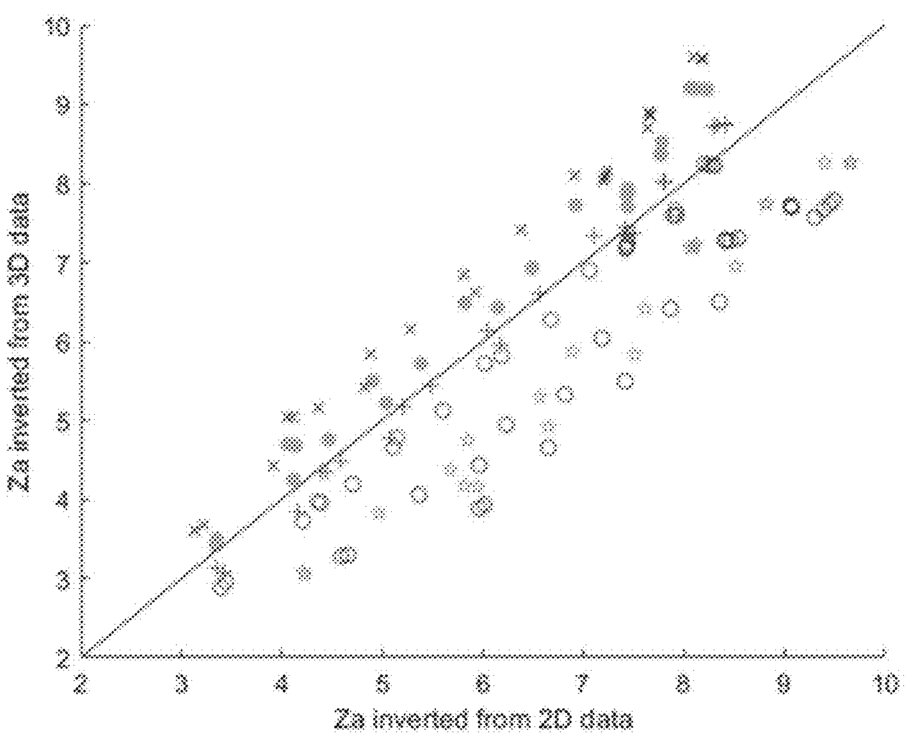
FIGS. 6A and 6B illustrate example cross plots of raw impedance, according to some examples of the present disclosure.
Figure 6B:
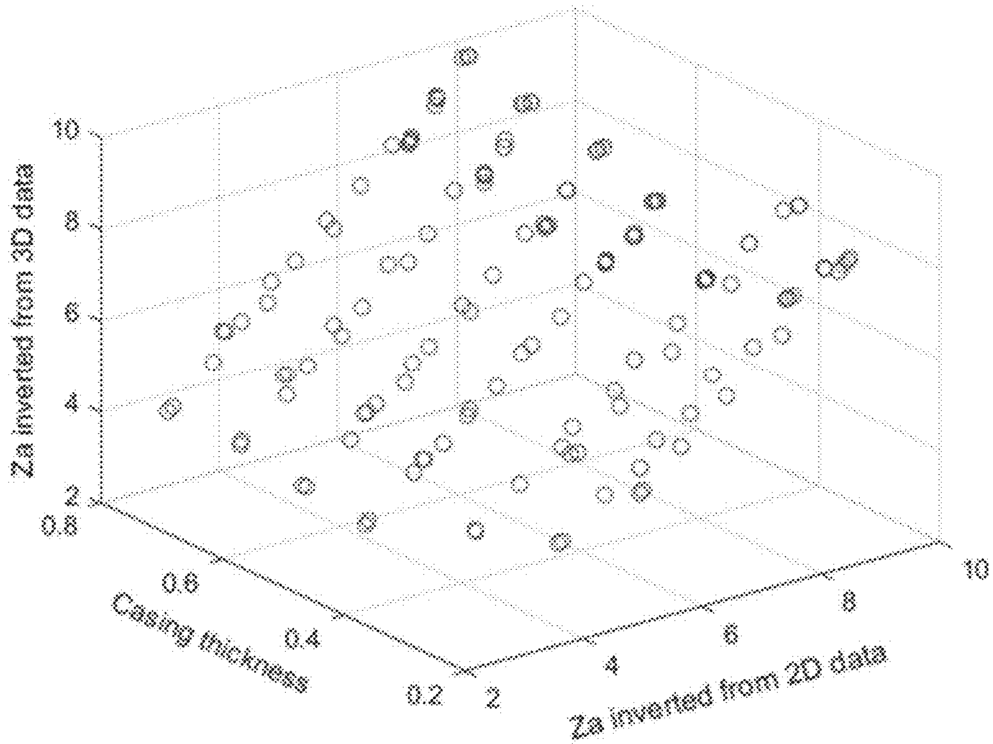

In some examples, the efficiency of determining the annulus impedance behind the casing of a wellbore can be improved by employing a correlation between the raw impedance obtained from a 2D simulation and that from 3D simulation. In some examples, using a 2D simulation takes significantly less (e.g., about 1% of the time) than a 3D simulation, and therefore can speed up the calibration process. Additionally, using the raw impedance obtained from a 2D inversion (rather than a 1D inversion) can improve the accuracy of the computed final impedance. This approach can be based on the following observation: as shown in FIG. 5A and FIG. 5B, although the waveforms are significantly different between 2D and 3D simulations, the raw impedance from the two data are closely correlated. That is, although the waveforms shown in FIG. 5A and FIG. 5B are significantly different between 2D and 3D simulations, the raw impedance from the two data can still be closely correlated. FIG. 6A is a cross plot of raw impedance from data of 2D simulation and 3D simulation, under various conditions. In these examples, each type of marker represents one casing thickness. FIG. 6B is a 3D cross plot of the same data which also includes a thickness dimension. It can therefore be seen that given a specific casing thickness, the raw impedance of the 3D data can be predicted using the 2D data. While the data presented in FIGS. 6A and 6B have been generated using one casing diameter, similar observations can be made with other casing diameters.

Figure 7:
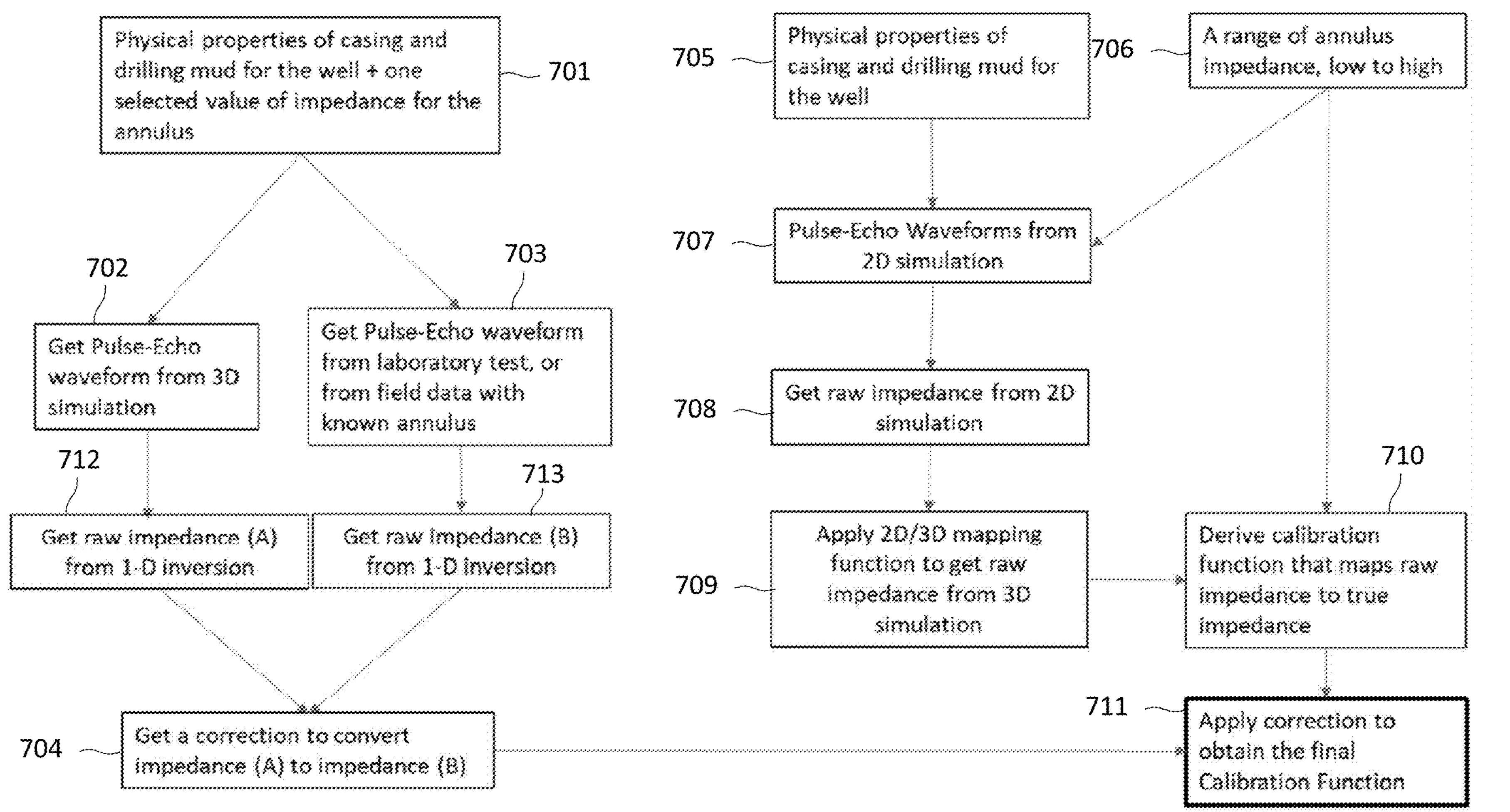
FIG. 7 illustrates an example workflow for deriving the calibration function described above with reference to FIG. 3, according to some examples of the present disclosure.

FIG. 7 illustrates an example workflow for deriving the calibration function described above with reference to FIG. 3 (e.g., block 304 in FIG. 3). The example illustrated in FIG. 7 is similar to the workflow described in FIG. 4 with a difference in the addition of the 2D/3D mapping function shown at block 709 and some associated changes. The 2D/3D mapping function shown at block 709 will be described in more detail below with reference to FIG. 8. Returning to FIG. 7, in some examples, a transfer function that maps a simulated raw impedance to the observed raw impedance is determined (block 704). In some cases this transfer function can be derived by determining a pulse-echo waveform from a 3D simulation (block 702) based on physical properties of the casing and drilling mud for the well plus one or more selected values of impedance for the annulus (block 701). In some examples, this determined pulse-echo waveform obtained from a 3D simulation can be inverted using a 1D inversion to obtain a simulated raw impedance 712. Additionally, a pulse-echo waveform can be obtained from a laboratory test of field data from a known annulus (block 703) based on physical properties of the casing and drilling mud for the well plus one or more selected values of impedance for the annulus (block 701). In some examples, this determined pulse-echo waveform obtained from known annulus data can be inverted using a 1D inversion to obtain an observed raw impedance 713. Subsequently, these two raw impedances (e.g., simulated raw impedance 712 and observed raw impedance 713) can be used to derive the transfer function at block 704.

Continuing with FIG. 7, at block 707, a pulse-echo waveform can be obtained from a 2D simulation using physical properties of the casing and drilling mud for the well (block 705) as well as a range of annulus impedance (block 706). In some examples, the range of annulus impedances can range from low to high. This contrasts the workflow of FIG. 4 wherein the pulse-echo waveforms are obtained from a 3D simulation. At block 708, the raw impedance can be determined from the 2D simulation and subsequently the 2D/3D mapping function (see FIG. 8 below) can be applied to obtain the raw impedance from a 3D simulation (block 709). Once the raw impedance from the 3D simulation is obtained at block 709, it can be used to derive the calibration function that maps this raw impedance to a true impedance (block 710). At block 711, the transfer function derived at block 704 can be applied to the calibration function determined at block 710 to obtain the final calibration function at block 711. This final calibration function 711 can be the same calibration function described with respect to FIG. 3 above (e.g., block 304 in FIG. 3).

Figure 8:
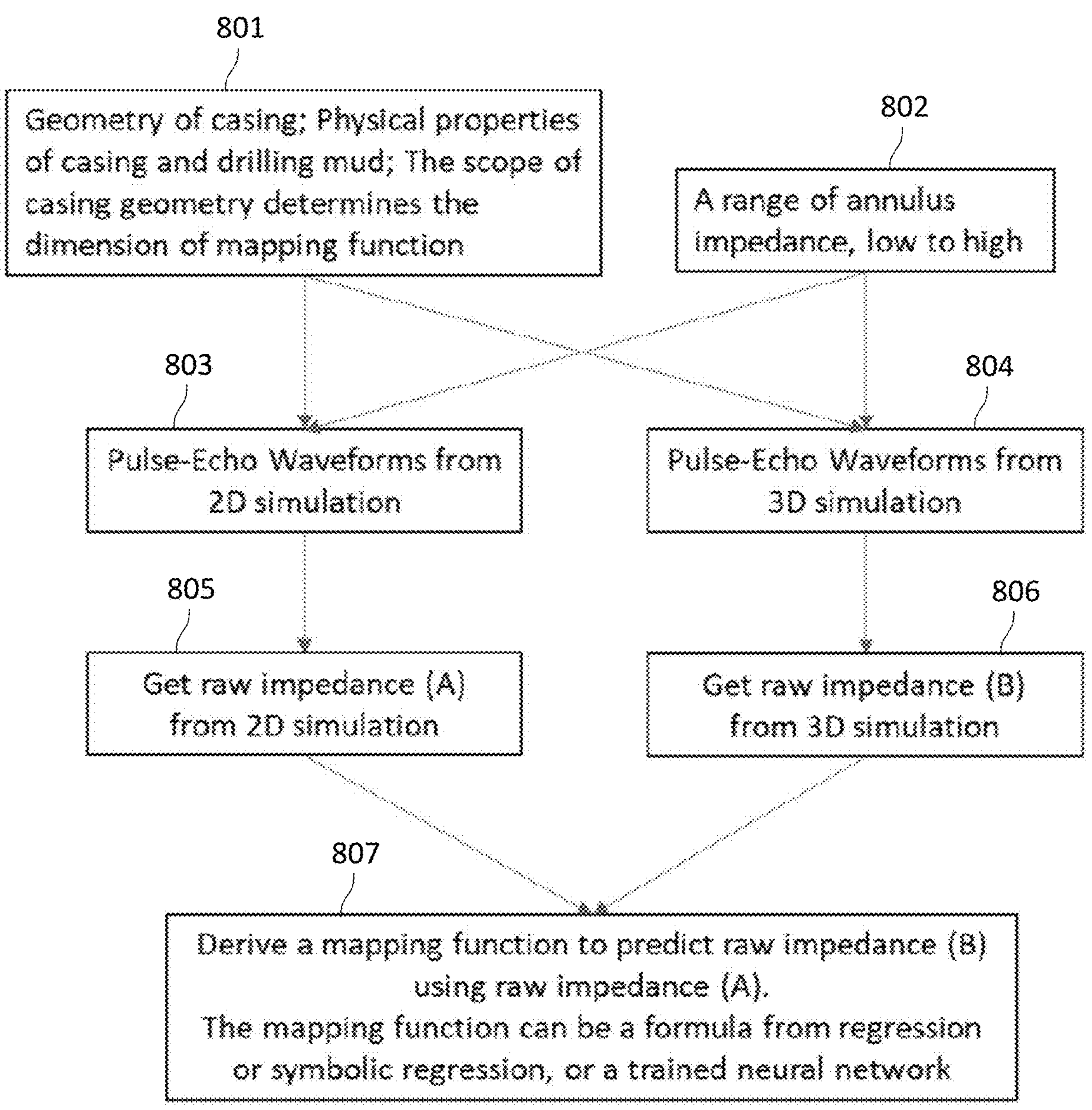
FIG. 8 illustrates an example workflow to derive the 2D/3D mapping function described with respect to FIG. 7, according to some examples of the present disclosure.

FIG. 8 illustrates an example workflow to derive the 2D/3D mapping function described with respect to FIG. 7 (e.g., the 2D/3D mapping function applied at block 709) above. In some examples, the steps to generate the 2D/3D mapping function can include running both a 2D simulation and a 3D simulation with variable casing size, thickness, borehole fluid properties, and annulus properties (among other properties) to create a mapping function between the 2D and the 3D impedances obtained via the simulations. For example, at step 803, the geometry of the casing, the physical properties of the casing and drilling mud, and the scope of the casing geometry (block 801) can be input together with a range of annulus impedance (block 802) to a 2D simulation to generate a pulse-echo waveform. In some examples, at block 805, the raw impedance of the 2D simulation can be obtained from the pulse-echo waveform obtained at block 803. Additionally, at step 804, the geometry of the casing, the physical properties of the casing and drilling mud, and the scope of the casing geometry (block 801) can be input together with a range of annulus impedance (block 802) to a 3D simulation to generate a pulse-echo waveform. In some examples, at block 806, the raw impedance of the 3D simulation can be obtained from the pulse-echo waveform obtained at block 804. In some examples, at block 807, the 2D/3D mapping function (e.g., the 2D/3D mapping function applied at block 709 in FIG. 7) can be derived based on the raw impedance of the 2D simulation obtained at block 805 and the raw impedance of the 3D simulation obtained at block 806. In some examples, the 2D/3D mapping function can be obtained using any of the following methods: statistical regression (e.g., linear regression), symbolic regression (e.g., data robot), or machine learning methods (such as, for example, a neural network with supervised training).

Further, different levels of generalization are contemplated. For example, a general mapping function can have casing size, casing thickness, and other variables as inputs. In other examples, a mapping function for each casing diameter (with different casing thickness) can be determined. In other examples, specific inputs can be employed to generate a mapping function for each casing size and thickness. In some examples, 2D/3D mapping functions can be stored in a library for later use.

Figure 9:
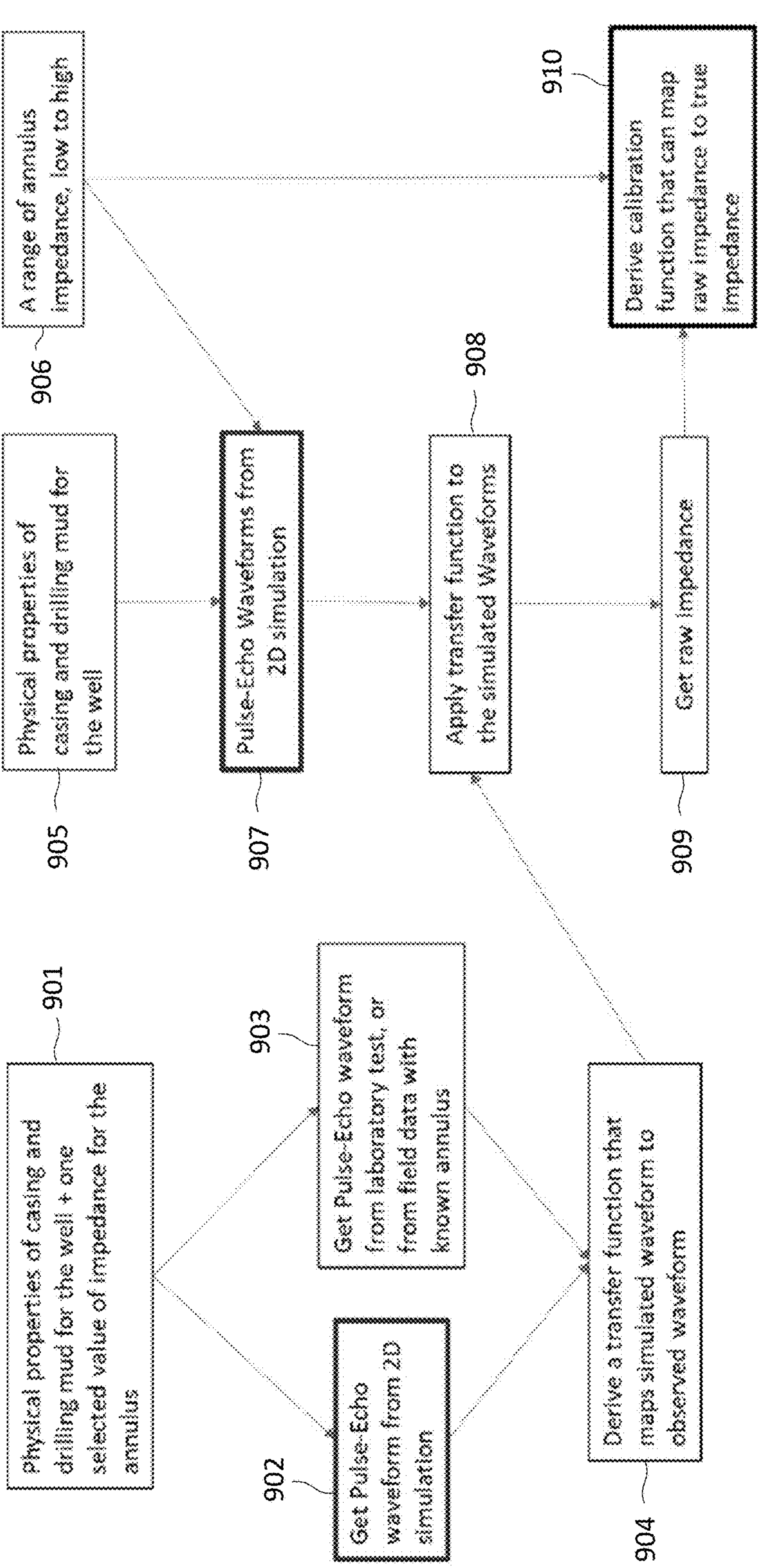
FIG. 9 illustrates an alternate flowchart detailing an example workflow for deriving the calibration function described above with reference to FIG. 3, according to some examples of the present disclosure.

FIG. 9 illustrates an alternate flowchart detailing an example workflow for deriving the calibration function described above with reference to FIG. 3 (e.g., block 304 in FIG. 3). The workflow illustrated in FIG. 9 is similar to the workflow illustrated in FIG. 4, wherein 3D simulation is replaced with 2D simulation. In the workflow illustrated in FIG. 9, the 2D/3D conversion (described with respect to FIGS. 7 and 8) can be implicitly done as part of the transfer function that maps simulated waveforms to observed waveforms in laboratory or field data. In some examples, a transfer function that maps a simulated waveform to the observed waveform is determined (block 904). In some cases, this transfer function can be derived by determining a pulse-echo waveform from a 2D simulation (block 902) based on physical properties of the casing and drilling mud for the well plus one or more selected values of impedance for the annulus (block 901). Additionally, a pulse-echo waveform can be obtained from a laboratory test of from field data from a known annulus (block 903) based on physical properties of the casing and drilling mud for the well plus one or more selected values of impedance for the annulus (block 901). Subsequently, these two pulse-echo waveforms (e.g., pulse-echo waveform obtained from a 2D simulation at block 902 and the pulse-echo waveform obtained at block 903) can be used to derive the transfer function at block 904.

Further, with reference to FIG. 9, at block 907 a pulse-echo waveform can be obtained from a 2D simulation using physical properties of the casing and drilling mud for the well (block 905) as well as a range of annulus impedance (block 906). In some examples, the range of annulus impedances can range from low to high. At block 908, the transfer function that was derived at block 904 can be applied to the simulated waveforms obtained at block 908. In some examples, the result of applying the transfer function at block 908 is the raw impedance 909. In some examples, this raw impedance 909 can then be used to derive the calibration function described in FIG. 3 (e.g., block 304 in FIG. 3). In some examples, the calibration function derived at 910 can map the raw impedance obtained at block 909 to determine the final impedance (e.g., block 305 in FIG. 3). The improved workflows for determining and evaluating the annulus impedance behind the casing of a wellbore explained with reference to FIGS. 4 and 7-9 provide a faster and more efficient approach. Example workflows for improving the quality and accuracy of the results are explained next.

Figure 10:
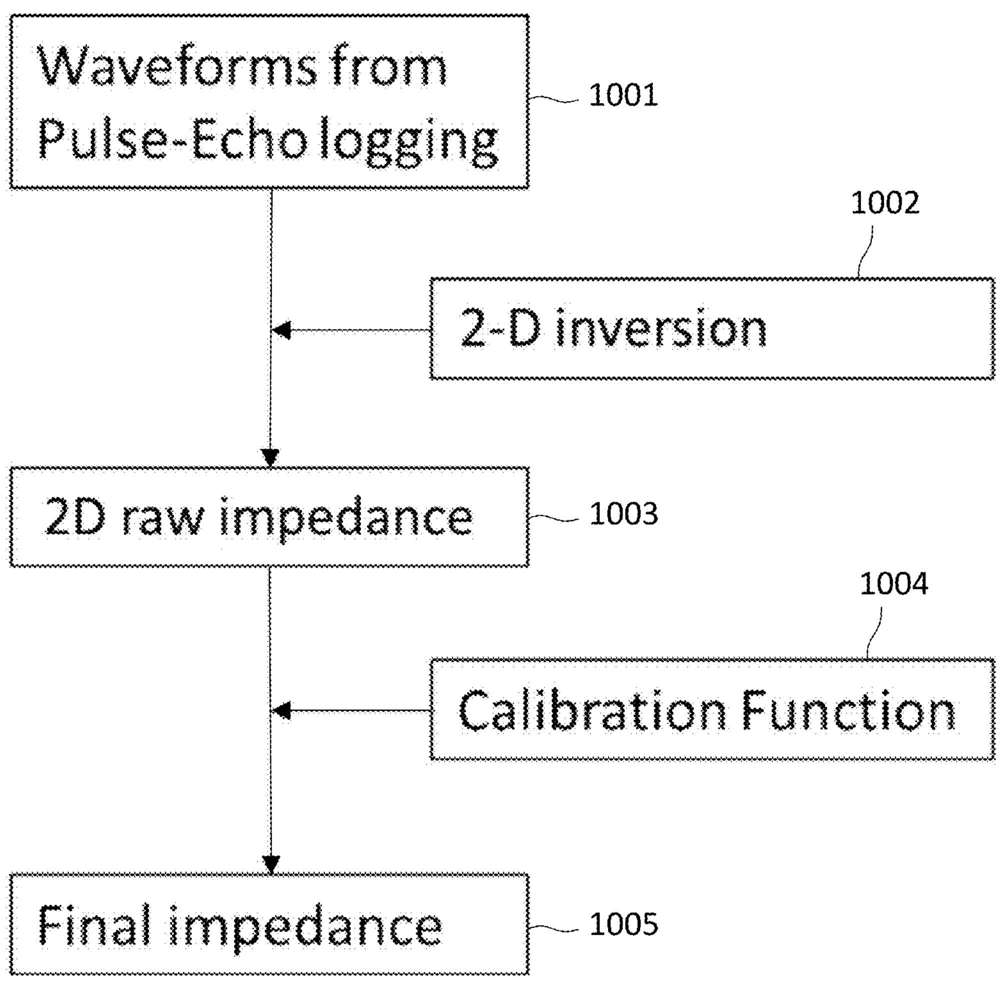
FIG. 10 illustrates a flowchart detailing an example improved high level pulse-echo workflow for determining the annulus impedance behind the casing, according to some examples of the present disclosure.

FIG. 10 illustrates a flowchart detailing an example improved high level pulse-echo workflow for determining the impedance of an annulus, such as an annulus behind a casing (or within a proximity of a casing) in a borehole/wellbore. As shown in FIG. 10, at block 1001, in some examples, the process can obtain waveforms from pulse-echo logging tools using signals received from a downhole tool (such as the ultrasonic tool described in FIG. 2, for example) in the field during wellbore operations. In some examples, at block 1002, the process can determine a 2D raw impedance 1003 by performing a 2D inversion on the waveforms obtained at block 1001. Determining a 2D raw impedance contrasts with the previous example high level pulse-echo workflow discussed above with reference to FIG. 3 wherein the raw impendence 303 is determined by performing a 1D inversion on the waveforms obtained at block 301. Since the raw impedance 303 (determined by 1D inversion) is generated first and then mapped to final impedance using a calibration function in the workflow discussed above with reference to FIG. 3, in some scenarios the mapping may not be one-to-one due to the large difference between 1D and 3D. Therefore, in the example improved high level pulse-echo workflow described in FIG. 10, a 2D inversion can be applied at block 1002 to obtain the 2D raw impedance 1003, rather than determining the raw impendence (using 1D inversion) as described in FIG. 3. In some examples, computing the 2D raw impedance 1003 can be done quickly due to recently improved hardware and algorithms.

Continuing with FIG. 10, in some examples, a calibration function 1004 can be implemented on the 2D raw impendence 1003 to determine a final annulus impedance 1005. In some examples, the calibration process at block 1004 can include performing a 3D numerical simulation using provided borehole information. As described above, the calibration function 1004 can be more efficient by making use of the correlation between raw impedance from 2D simulation and that from 3D simulation. In some examples, 2D simulation takes only about 1% of the time required for 3D simulation, and therefore can speed up the calibration process dramatically. Additionally, using raw impedance from 2D inversion instead of 1D inversion can also improve the accuracy of the computed final annulus impedance.

Figure 11:
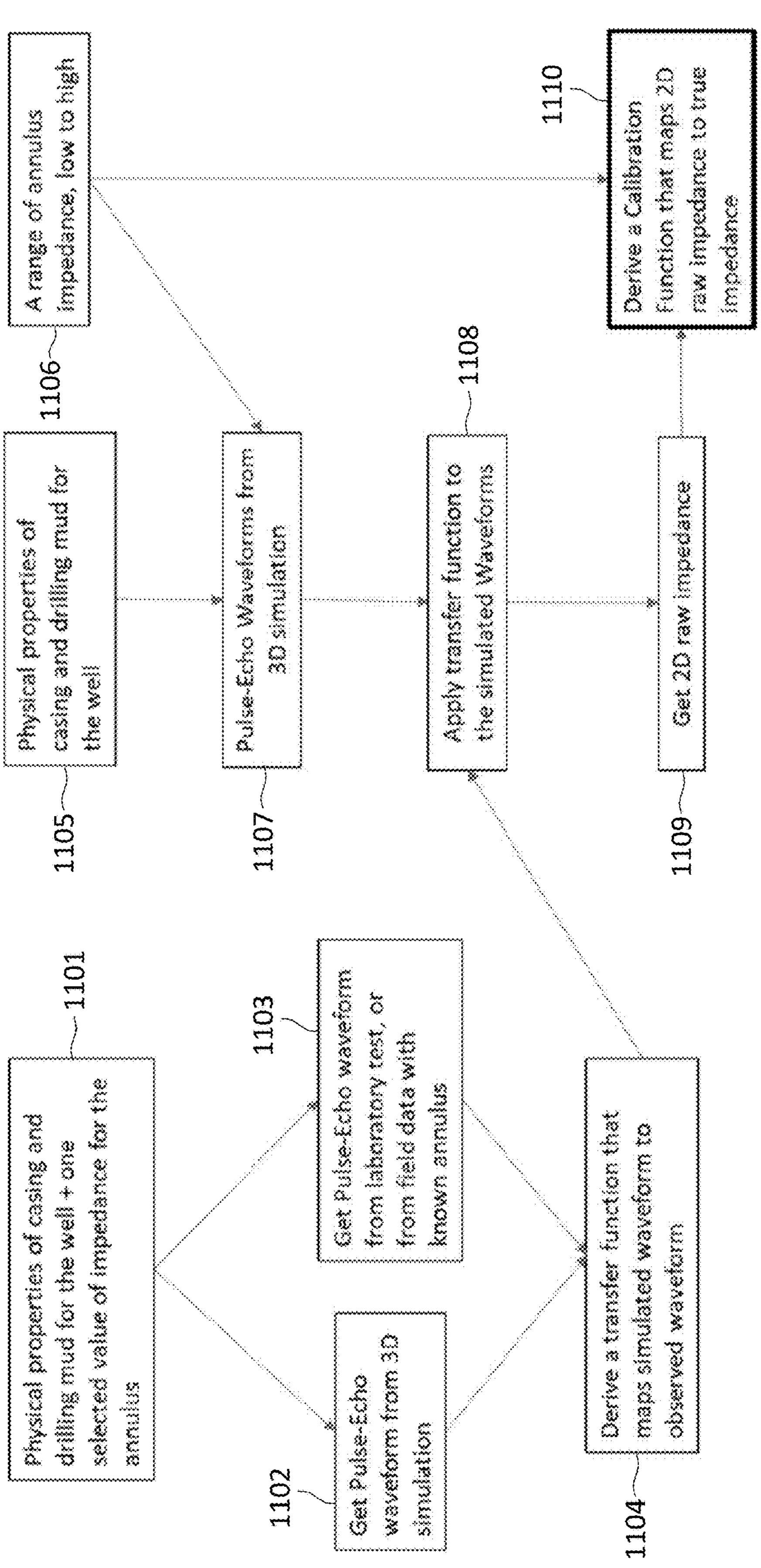
FIG. 11 illustrates a flowchart detailing an example workflow for deriving the calibration function described above with reference to FIG. 10, according to some examples of the present disclosure.

FIG. 11 illustrates a flowchart detailing an example improved workflow for deriving the calibration function described above with reference to FIG. 10 (e.g., block 1004 in FIG. 10). In some examples, a transfer function that maps a simulated waveform to the observed waveform is determined (block 1104). In some cases, this transfer function can be derived by determining a pulse-echo waveform from a 3D simulation (e.g., block 1102 in FIG. 11) based on physical properties (e.g., density, elasticity, thickness, bonding, primary wave velocity, etc.) of the casing and drilling mud for the well plus one or more selected values of impedance for the annulus (block 1101). In some examples, a pulse-echo waveform can be obtained from a laboratory test of from field data from an annulus (block 1103) based on physical properties of the casing and drilling mud for the well plus one or more selected values of impedance for the annulus (block 1101). These two pulse-echo waveforms (e.g., pulse-echo waveform obtained from a 3D simulation at block 1102 and the pulse-echo waveform obtained at block 1103) can be used to derive the transfer function at block 1104.

At block 1107, the process can obtain a pulse-echo waveform from a 3D simulation using physical properties of the casing and drilling mud for the well (block 1105) as well as a range of annulus impedance (block 1106). In some examples, the range of annulus impedances can range from low to high. At block 1108, the process can apply the transfer function that was derived at block 1104 to the simulated waveforms obtained at block 1107. In some examples, at block 1109, the process can obtain the 2D raw impedance using as input the result of applying the transfer function at block 1108. In some examples, this 2D raw impedance can be used to derive the calibration function described in FIG. 10 (e.g., block 1004 in FIG. 10). In some examples, at block 1110, the process can derive a calibration function and use the calibration function to map the 2D raw impedance obtained at block 1109 to the final impedance (e.g., block 1005 in FIG. 10). As previously discussed, using the raw impedance obtained from a 2D inversion (rather than a 1D inversion) can improve the accuracy of the computed final impedance.

Figure 12:
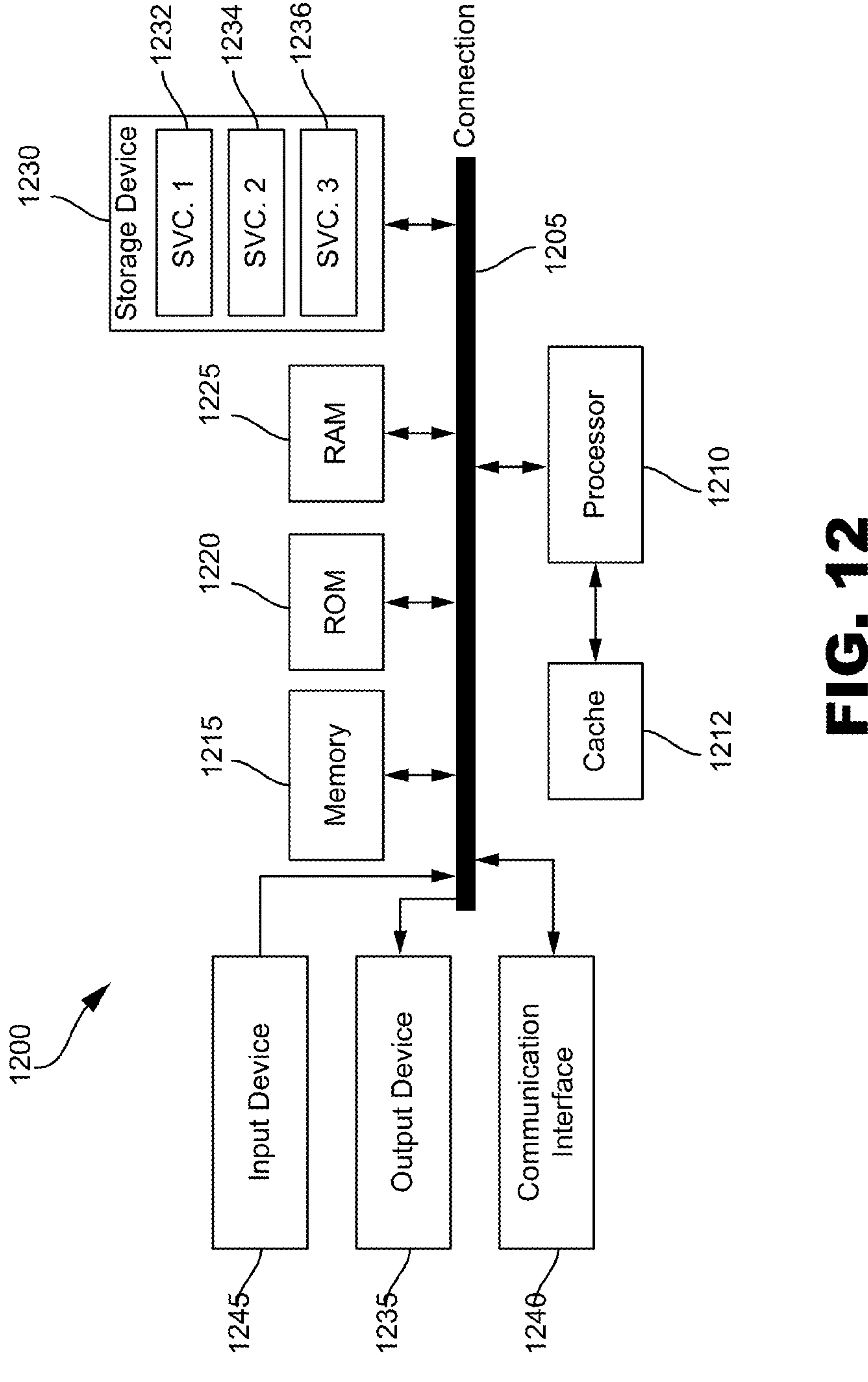
FIG. 12 illustrates an example computing device and hardware that can be used to implement some aspects of the disclosed technology.

FIG. 12 illustrates an example computing device architecture 1200 which can be employed to perform any of the systems and techniques described herein. In some examples, the computing device architecture can be integrated with the electromagnetic imager tools described herein. Further, the computing device can be configured to implement the techniques of controlling borehole image blending through machine learning described herein.

The components of the computing device architecture 1200 are shown in electrical communication with each other using a connection 1205, such as a bus. The example computing device architecture 1200 includes a processing unit (CPU or processor) 1210 and a computing device connection 1205 that couples various computing device components including the computing device memory 1215, such as read only memory (ROM) 1220 and random-access memory (RAM) 1225, to the processor 1210.

The computing device architecture 1200 can include a cache of high-speed memory connected directly with, in close proximity to, or integrated as part of the processor 1210. The computing device architecture 1200 can copy data from the memory 1215 and/or the storage device 1230 to the cache 1212 for quick access by the processor 1210. In this way, the cache can provide a performance boost that avoids processor 1210 delays while waiting for data. These and other modules can control or be configured to control the processor 1210 to perform various actions. Other computing device memory 1215 may be available for use as well. The memory 1215 can include multiple different types of memory with different performance characteristics. The processor 1210 can include any general-purpose processor and a hardware or software service, such as service 1 1232, service 2 1234, and service 3 1236 stored in storage device 1230, configured to control the processor 1210 as well as a special-purpose processor where software instructions are incorporated into the processor design. The processor 1210 may be a self-contained system, containing multiple cores or processors, a bus, memory controller, cache, etc. A multi-core processor may be symmetric or asymmetric.

To enable user interaction with the computing device architecture 1200, an input device 1245 can represent any number of input mechanisms, such as a microphone for speech, a touch-sensitive screen for gesture or graphical input, keyboard, mouse, motion input, speech and so forth. An output device 1235 can also be one or more of a number of output mechanisms known to those of skill in the art, such as a display, projector, television, speaker device, etc. In some instances, multimodal computing devices can enable a user to provide multiple types of input to communicate with the computing device architecture 1200. The communications interface 1240 can generally govern and manage the user input and computing device output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof. The storage device 1230 can include services 1232, 1234, 1236 for controlling the processor 1210. Other hardware or software modules are contemplated. The storage device 1230 can be connected to the computing device connection 1205. In one aspect, a hardware module that performs a particular function can include the software component stored in a computer-readable medium in connection with the necessary hardware components, such as the processor 1210, connection 1205, output device 1235, and so forth, to carry out the function.

For clarity of explanation, in some instances the present technology may be presented as including individual functional blocks including functional blocks comprising devices, device components, steps or routines in a method implemented in software, or combinations of hardware and software.

In some instances, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples and aspects thereof, but those skilled in the art will recognize that the application is not limited thereto. Thus, while illustrative examples and aspects of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, examples and aspects of the systems and techniques described herein can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Methods and apparatus of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Such methods may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1. A method comprising: determining physical properties of a casing and physical properties of drilling mud gathered by one or more sensors of a log while drilling ("LWD") tool during operation of the LWD tool in a borehole; and determining a correlation function based on the physical properties of the casing and physical properties of the drilling mud as well as one selected value of impedance for an annulus, wherein the correlation function is determined by: performing a 3D simulation based on the physical properties of the casing and physical properties of the drilling mud as well as the one selected value of impedance for the annulus to determine a first pulse-echo waveform and performing a 1D inversion on the first pulse-echo waveform to determine a first raw impedance; determining a second pulse-echo waveform based on known field data and performing a 1D inversion on the second pulse-echo waveform to determine a second raw impedance; and determining a correlation based on the first raw impedance and the second raw impedance that converts the first raw impedance to the second raw impedance; determining a first calibration function that determines a true impedance, wherein the first calibration function is determined by: performing a 2D simulation based on the physical properties of the casing and physical properties of the drilling mud as well as a range of one or more values of impedance for the annulus to determine a third pulse-echo waveform and performing a 2D inversion on the third pulse-echo waveform to determine a third raw impedance; applying a 2D/3D mapping function to the third raw impedance to determine a fourth raw impedance; deriving the first calibration function to map the fourth raw impedance to a true impedance; and applying the determined correlation function to the determined true impedance to obtain a final calibration function.

Aspect 2. The method of Aspect 1, wherein the 2D/3D mapping function is created using at least one of statistical regression, symbolic regression, and machine learning.

Aspect 3. The method of Aspect 1 or 2, wherein an input to the 2D/3D mapping function includes at least one of casing size, and casing thickness.

Aspect 4. The method of any of Aspects 1 to 3, wherein the 2D/3D mapping function is stored in a library.

Aspect 5. The method of any of Aspects 1 to 4, wherein the first pulse-echo waveform is determined from a laboratory test of field data from a second annulus based on physical properties of a casing and a drilling mud for a well and one or more selected values of impedance for the annulus.

Aspect 6. The method of any of Aspects 1 to 5, wherein the range of one or more values of impedance for the annulus ranges from low to high.

Aspect 7. The method of any of Aspects 1 to 6, wherein performing the ID inversion on the second pulse-echo waveform obtains a simulated raw impedance.

Aspect 8. A method comprising: accessing physical properties of a casing and physical properties of drilling mud gathered by one or more sensors of a downhole tool during operation of the downhole tool in a borehole; determining a transfer function based on the physical properties of the casing and physical properties of the drilling mud as well as one selected value of impedance for an annulus, wherein the transfer function is determined by: performing a 2D simulation based on the physical properties of the casing and physical properties of the drilling mud as well as the one selected value of impedance for the annulus to determine a first pulse-echo waveform; determining a second pulse-echo waveform based on known field data; and determining a transfer function based on the first pulse-echo waveform and the second pulse-echo waveform; determining a calibration function, wherein the calibration function is determined by: performing a 2D simulation based on the physical properties of the casing and physical properties of the drilling mud as well as a range of one or more values of impedance for the annulus to determine a third pulse-echo waveform; applying the transfer function to the third pulse-echo waveform to create a fourth waveform and determine a raw impedance based on the fourth waveform; deriving a calibration function to map the raw impedance to a true impedance.

Aspect 9. The method of Aspect 8, wherein the downhole tool is an ultrasonic tool.

Aspect 10. The method of Aspect 8 or 9, wherein the physical properties include at least one of density, elasticity, thickness, bonding, and primary wave velocity.

Aspect 11. The method of any of Aspects 8 to 10, wherein the transfer function is derived by determining a pulse-echo waveform from a 2D simulation based on physical properties of a casing and a drilling mud for a well and one or more selected values of impedance for the annulus.

Aspect 12. The method of any of Aspects 8 to 11, wherein the first pulse-echo waveform is determined from a laboratory test of field data from a second annulus based on physical properties of a casing and a drilling mud for a well and one or more selected values of impedance for the annulus.

Aspect 13. The method of any of Aspects 8 to 12, wherein the range of one or more values of impedance for the annulus ranges from low to high.

Aspect 14. The method of any of Aspects 8 to 13, wherein the calibration function is implemented on a 2D raw impendence to determine an annulus impedance.

Aspect 15. A system comprising: at least one memory; and at least one processor coupled to the at least one memory, the at least one processor configured to: access physical properties of a casing and physical properties of drilling mud gathered by one or more sensors of a downhole tool during operation of the downhole tool in a borehole; determine a transfer function based on the physical properties of the casing and physical properties of the drilling mud as well as one selected value of impedance for an annulus, wherein the transfer function is determined by: perform a 2D simulation based on the physical properties of the casing and physical properties of the drilling mud as well as the one selected value of impedance for the annulus to determine a first pulse-echo waveform; determine a second pulse-echo waveform based on known field data; and determine a transfer function based on the first pulse-echo waveform and the second pulse-echo waveform; determining a calibration function, wherein the calibration function is determined by: perform a 2D simulation based on the physical properties of the casing and physical properties of the drilling mud as well as a range of one or more values of impedance for the annulus to determine a third pulse-echo waveform; apply the transfer function to the third pulse-echo waveform to create a fourth waveform and determine a raw impedance based on the fourth waveform; derive a calibration function to map the raw impedance to a true impedance.

Aspect 16. The system of Aspect 15, wherein the downhole tool is an ultrasonic tool.

Aspect 17. The system of Aspect 15 or 16, wherein the physical properties include at least one of density, elasticity, thickness, bonding, and primary wave velocity.

Aspect 18. The system of any of Aspects 15 to 17, wherein the transfer function is derived by determining a pulse-echo waveform from a 2D simulation based on physical properties of a casing and a drilling mud for a well and one or more selected values of impedance for the annulus.

Aspect 19. The system of any of Aspects 15 to 18, wherein the first pulse-echo waveform is determined from a laboratory test of field data from a second annulus based on physical properties of a casing and a drilling mud for a well and one or more selected values of impedance for the annulus.

Aspect 20. The system of any of Aspects 15 to 19, wherein the range of one or more values of impedance for the annulus ranges from low to high.

What is claimed is:

1. A method comprising:

determining physical properties of a casing and physical properties of drilling mud gathered by one or more sensors of a downhole tool during operation of the downhole tool in a borehole; and determining a correlation function based on the physical properties of the casing and physical properties of the drilling mud as well as one selected value of impedance for an annulus, wherein the correlation function is determined by:

performing a 3D simulation based on the physical properties of the casing and physical properties of the drilling mud as well as the one selected value of impedance for the annulus to determine a first pulse-echo waveform and performing a 1D inversion on the first pulse-echo waveform to determine a first raw impedance;

determining a second pulse-echo waveform based on known field data and performing a 1D inversion on the second pulse-echo waveform to determine a second raw impedance; and determining the correlation function based on the first raw impedance and the second raw impedance, such that it converts the first raw impedance to the second raw impedance;

determining a first calibration function that determines a true impedance, wherein the first calibration function is determined by:

performing a 2D simulation based on the physical properties of the casing and physical properties of the drilling mud as well as a range of one or more values of impedance for the annulus to determine a third pulse-echo waveform and performing a 2D inversion on the third pulse-echo waveform to determine a third raw impedance;

applying a 2D/3D mapping function to the third raw impedance to determine a fourth raw impedance;

applying the first calibration function to map the fourth raw impedance to a true impedance; and applying the determined correlation function to the determined true impedance to obtain a final calibration function.

2. The method of claim 1, wherein the 2D/3D mapping function is created using at least one of statistical regression, symbolic regression, and machine learning.

3. The method of claim 1, wherein an input to the 2D/3D mapping function includes at least one of casing size, and casing thickness.

4. The method of claim 1, wherein the 2D/3D mapping function is stored in a library.

5. The method of claim 1, wherein the first pulse-echo waveform is determined from a laboratory test of field data from a second annulus based on physical properties of a casing and a drilling mud for a well and one or more selected values of impedance for the annulus.

6. The method of claim 1, wherein the range of one or more values of impedance for the annulus ranges from low to high.

7. The method of claim 1, wherein performing the 1D inversion on the second pulse-echo waveform obtains a simulated raw impedance.

* * * * *